(12) United States Patent
Krka et al.

(10) Patent No.: US 9,774,553 B2
(45) Date of Patent: Sep. 26, 2017

(54) SYSTEMS AND METHODS FOR ESTIMATING MESSAGE SIMILARITY

(71) Applicant: Google Inc., Mountain View, CA (US)

(72) Inventors: Ivo Krka, Zurich (CH); Itamar Gilad, Zurich (CH); Karol Kurach, Zurich (CH); Andrew Dai, San Francisco, CA (US); Liam MacDermed, Berkeley, CA (US); Peter Junteng Liu, Mountain View, CA (US); Balint Miklos, Zurich (CH); Alexandru Damian, Zurich (CH)

(73) Assignee: Google Inc., Mountain View, CA (US)

( * ) Notice: Subject to any disclaimer, the term of this patent is extended or adjusted under 35 U.S.C. 154(b) by 247 days.

(21) Appl. No.: 14/557,310

(22) Filed: Dec. 1, 2014

(65) Prior Publication Data
US 2016/0156580 A1 Jun. 2, 2016

(51) Int. Cl.
*G06F 15/16* (2006.01)
*H04L 12/58* (2006.01)

(52) U.S. Cl.
CPC .............. *H04L 51/22* (2013.01); *H04L 51/14* (2013.01)

(58) Field of Classification Search
CPC ................................ H04L 51/22; H04L 51/14
USPC .................................................. 709/206, 207
See application file for complete search history.

(56) References Cited

U.S. PATENT DOCUMENTS

| 8,266,218 B2 * | 9/2012 | Keohane | G06Q 10/107 709/206 |
|---|---|---|---|
| 2008/0010274 A1 * | 1/2008 | Carus | G06N 99/005 |
| 2009/0187629 A1 * | 7/2009 | Chakra | G06Q 10/107 709/206 |
| 2009/0265160 A1 * | 10/2009 | Williams | G06F 17/27 704/9 |
| 2010/0274795 A1 * | 10/2010 | Rallapalli | G06F 17/30545 707/769 |
| 2013/0262598 A1 * | 10/2013 | Makanawala | H04L 51/32 709/206 |
| 2013/0304826 A1 * | 11/2013 | Li | H04L 51/14 709/206 |
| 2014/0040274 A1 * | 2/2014 | Aravamudan | G06F 17/30386 707/741 |
| 2015/0341300 A1 * | 11/2015 | Swain | H04L 51/22 707/738 |
| 2016/0098745 A1 * | 4/2016 | Adams | G06Q 30/0246 705/14.45 |

* cited by examiner

*Primary Examiner* — Bryan Lee
*Assistant Examiner* — Oluwatosin Gidado
(74) *Attorney, Agent, or Firm* — Morgan, Lewis & Bockius LLP

(57) ABSTRACT

Systems and methods are provided for organizing messages. A plurality of messages is communicated to a user with a designation of the message category of each respective message in the plurality of messages. The plurality of messages includes, for each respective message category in a plurality of message categories, at least one message in the respective message category. A user selection of a first message in the plurality of messages is received, whereupon a subset of the plurality of messages similar to the first message is selected based upon respective comparisons of continuous vector representations of (i) a set of words in the first message and (ii) a corresponding set of words in messages in the subset of messages. An identification of each respective message in the subset of messages is then displayed.

25 Claims, 12 Drawing Sheets

SYSTEMS AND METHODS FOR ESTIMATING MESSAGE SIMILARITY

TECHNICAL FIELD

This specification describes technologies relating to organizing electronic messages in general, and specifically to systems and methods for semantic selection of messages that are similar to a message that a user has identified.

BACKGROUND

Electronic messaging, through mechanisms such as E-mail, is an important method of communication. For instance, E-mail messaging enables global communication at negligible incremental cost and has contributed to the emergence of organizations that are distributed world-wide, allowing people to communicate across space and time. While a common application of electronic messaging is one of communication, it is now used for additional functions such as task management, social networking, personal archiving, and file transfer, to name a few such functions. Because of its popularity, users are faced with rising volumes of electronic messages. Large amounts of information need to be processed and organized. As such, without the aid of tools to assist with the organization of such large amounts of information, many users face electronic messaging overload.

A variety of approaches have been implemented to assist users with such large quantities of messages. For example, electronic message overload can be addressed at the level of the individual, by installing organization software, or at global level where email users worldwide adopt new standards of communication. There is also a time component: electronic messaging overload applies to both managing current electronic messages and handling past messages.

One way to handle electronic messages is to implement automatic foldering. That is, automatically moving user's electronic messages into folders based on either filtering rules or categorization rules. However, such schemes have drawbacks. The first is the reliance on the accuracy of classifiers on real-world data. While classifiers do exist that can classify electronic messages, implementation of highly accurate classifiers is a laborious task that requires extensive effort by highly skilled workers. Second, many users distrust automatic schemes in which electronic message disappear from the inbox, never to be seen again. Third, folders typically require seeding with example data so that the classifiers have instances from which to learn.

Although automatic foldering has its drawbacks, the classification of messages, into message categories, in principal, does help users to parse through messages. For example, having messages classified into just a few basic categories (e.g., promotions, social, updates, forums, travel, finance, and/or receipts) greatly assists a user (e.g., electronic message recipient) in determining which messages to review, and allows the recipient to review messages that are of a similar type at the same time (e.g., all personal messages at the same time, all promotional messages at the same time, etc.). Moreover, such classification helps to put similar messages in the same place, for ease of comparison. As such, message classification provides a more efficient, productive environment for recipients.

While highly accurate classifiers have been developed to correctly categorize messages, particularly in instances in which the universe of possible message classifications is limited to a small finite set, disagreement between the classification assigned to messages by automated classifiers and recipient opinion arises. In such instances, a user may manually recategorize the message, a process termed a message category correction event. For instance, consider the case in which an automated classifier classifies a given message as a promotion. The message is then delivered to the recipient of the message. The message recipient believes the message should be categorized under social. The message recipient uses a messaging application in which the category of messages is made known to the user to change the message category from promotion to social. Such message category correction events are typically done in order to provide the user with a means for more easily retrieving the message at a later date. For example, if messages are correctly categorized, the user can use a message category, with our without other search criteria, to retrieve the message.

Manual message category correction events, particularly in the context of receiving high volumes of message, and/or in the context of mobile devices with more limited user interface functionality, is not always satisfactory to the user and it has been observed that many users consequently do not recategorize messages that they perceive as being incorrectly categorized, or, perhaps, only recategorize a limited number of miscategorized messages rather than all miscategorized messages.

The above discussion highlights the need for improved tools for assisting users in identifying messages that are similar to a message that the user has selected. One such use case where this need exists is where the user has enacted a message category correction event on a specified message. Tools for semantically identifying similar messages are desired. More generally, tools that semantically identify messages that are similar to a message identified by a user for any purpose are needed.

The above identified technical problems are reduced or eliminated by the systems and methods disclosed herein.

SUMMARY

Technical solutions (e.g., computing systems, methods, and non-transitory computer readable storage mediums) for assisting users with identifying messages that are similar to a selected message are provided. For instance, in the use case in which a user initiates a message category correction event for one message, other messages that are similar to that particular message are identified, regardless of their current message category. The user is then given the option to apply the same message category correction event to these identified messages. This thereby decreases the amount of manual intervention required by a user to maintain the correct message categorizing of received messages and thus makes it more likely that the user will to maintain the correct message categories of such messages. In still other use cases, when the user reads a new messages, those messages that are semantically similar to the specific new message that the user has selected for reading are brought to the attention of the user. There is no requirement that such similar messages be in the same conversation or thread as the message that the user is reading. All that is required is that the user have read privileges over the messages that are identified as similar to the message the user is reading. More generally, when a user identifies one message, other messages that are semantically similar to the selected message are identified for the user. In this way, the user can quickly see messages that are similar to the selected message by semantic means. Advantageously, there is no requirement that the messages that are deemed to be semantically similar be in the same conversation, thread, cluster or category as the selected message. The disclosed methods reduce the amount of computation required by a computer to identifying messages that are relevant to a particular message identified by a user. Because the query set is a single message, a very specific semantic search is advantageously implemented to identify related messages.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used In some implementations, there is provided a method of organizing messages at a computer system having one or more processors and memory storing one or more programs for execution by the one or more processors. In the method a first plurality of messages are communicated to a user with an optional designation of the message category of each respective message in the first plurality of messages. Optionally, the first plurality of messages includes, for each respective message category in a plurality of message categories, at least one message in the respective message category. Responsive to a selection of a first message in the first plurality of messages a subset of messages in the first plurality of messages that are similar to the first message are selected based upon respective comparisons between (i) a continuous vector representation of a first set of words in the first message and (ii) a continuous vector representation of a corresponding set of words in each respective message in the subset of messages. An identification of each message in the subset of messages is displayed. In this way, the user can rapidly see which messages are semantically similar to a selected message. In one such application, the similar messages are grouped together in the in-box of a messaging application.

In some embodiments, the user selection of the first message is a message category correction event for the first message initiated by the user. In some such embodiments, the user is then prompted as to whether to apply the message category correction event to any one of the messages in the selected subset of messages. Upon receipt of an affirmative response, the message category correction event is applied to messages in the subset of messages selected by the user. In some such embodiments, prior to the message category correction event, a message in the subset of messages is in a different category in the plurality of message categories than the first message.

In some embodiments, the method further comprises designating the subset of messages as a new category and this new category is added to the plurality of message categories.

In some embodiments, the user selection of the first message is a read message request initiated by the user in which the user has selected a message to read. In some such embodiments, prior to the read request, a message in the subset of messages that is identified as being similar to the first message is in a different category in the plurality of message categories than the first message.

In some embodiments, prior to the communicating, each message in the plurality of messages is classified using a classifier, thereby independently identifying a message category in the plurality of message categories for each respective message in the first plurality of messages. In some embodiments, the method further comprises designating the subset of messages as a new category and this new category is added to the plurality of message categories. In some such embodiments, the classifier is updated to include an ability to classify messages into the new category.

In some embodiments, the communicating comprises delivering messages in the first plurality of messages to a user device associated with the user at a plurality of discrete instances over a period of time, thereby collectively communicating the first plurality of messages over the period of time. For instance, subsets of the first plurality of messages can be communicated over a period of minutes, hours, days or weeks in order to collectively communicate the full plurality of messages.

The semantic analysis of the first message selected by the user can be used to categorize messages received by the user in the future. As an example, in some embodiments, a second message, in a second plurality of messages, is identified that is similar to the first message based upon a comparison of (i) continuous vector representations of the first set of words in the first message and (ii) continuous vector representations of a corresponding set of words in the second message. Upon such identification, the second message is categorized into the same category as the first message and communicated to the user with a designation of the message category of the second message.

In some embodiments, each word in the first set of words is from a subject header of the first message, and each word in each respective corresponding set of words is from a subject header of the corresponding message in the subset of messages. In some alternative embodiments, there is selected for the first set of words, a subset of words or phrases in a message body of the first message, and this selecting includes, for at least one respective word or phrase in the message body, replacing the respective word or phrase with a synonym for the respective word or phrase obtained from a knowledge graph, thereby including the synonym for the respective word or phrase in the first set of words in place of the respective word or phrase.

In some embodiments, the selecting is further based on a comparison of meta-information extracted from the first message and meta information extracted from each respective message in the first plurality of messages. Nonlimiting examples of such meta information is at least one of a determination as to whether a user associated with the message communicates directly with a certain other user, a message sender identity, a message recipient identity, a message category, a message date, a message sender domain, and a personal contact of the user associated with the message. In some embodiments, each item of meta-information extracted from the first message is respectively represented in binary form, each item of meta information extracted from each respective message in the first plurality of messages is respectively represented in binary form, the comparison between the meta-information extracted from the first message and meta information extracted from a specified message in the first plurality of messages comprises determining a dot product between (a) the meta-information extracted from the first message and (b) the meta information extracted from the specified message, and the dot product and the continuous vector representation comparison of the specified message are both used to determine whether to include the specified message in the subset of messages.

In some embodiments, the selecting comprises parsing a message body of the first message into sentences, extracting one or more verb-object or verb-subject word pairs from sentences in the message body of the first message for inclusion in the first set of words, parsing a respective message body of each message in the subset of messages into sentences, and extracting subject-verb word pairs from sentences in a message body of each respective message in the subset of messages for inclusion in the corresponding set of words for the respective message in the subset of messages.

Another aspect of the present disclosure is computing system comprising one or more processors and memory storing one or more programs to be executed by the one or more processors. The one or more programs comprise instructions for communicating a first plurality of messages to a user with a designation of the message category of each respective message in the first plurality of messages. The first plurality of messages includes, for each respective message category in a plurality of message categories, at least one message in the respective message category. Responsive to selection of a first message in the first plurality of messages by the user, a subset of messages in the first plurality of messages is selected that are similar to the first message based upon respective comparisons between (i) a continuous vector representation of a first set of words in the first message and (ii) a continuous vector representation of a corresponding set of words in each respective message in the subset of messages. An identification of each message in the subset of messages is displayed to the user.

Another aspect of the present disclosure provides a non-transitory computer readable storage medium storing one or more programs configured for execution by a computer. The one or more programs comprise instructions for communicating a first plurality of messages to a user with a designation of the message category of each respective message in the first plurality of messages. The first plurality of messages includes, for each respective message category in a plurality of message categories, at least one message in the respective message category. Responsive to a selection of a first message in the first plurality of messages by the user, a subset of messages in the first plurality of messages is selected that are similar to the first message based upon respective comparisons between (i) a continuous vector representation of a first set of words in the first message and (ii) a continuous vector representation of a corresponding set of words in each respective message in the subset of messages. An identification of each message in the subset of messages is displayed to the user.

Thus, these methods, systems, and non-transitory computer readable storage medium provide new, less cumbersome, more efficient ways to identify messages that are semantically similar to an identified message.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

The implementations described herein provide various technical solutions to identifying semantically similar electronic messages generally. A particular use case for such identification is to propagate a manually initiated message category correction event to additional suitable messages. Details of implementations are now described in relation to the Figures.

Figure 1:
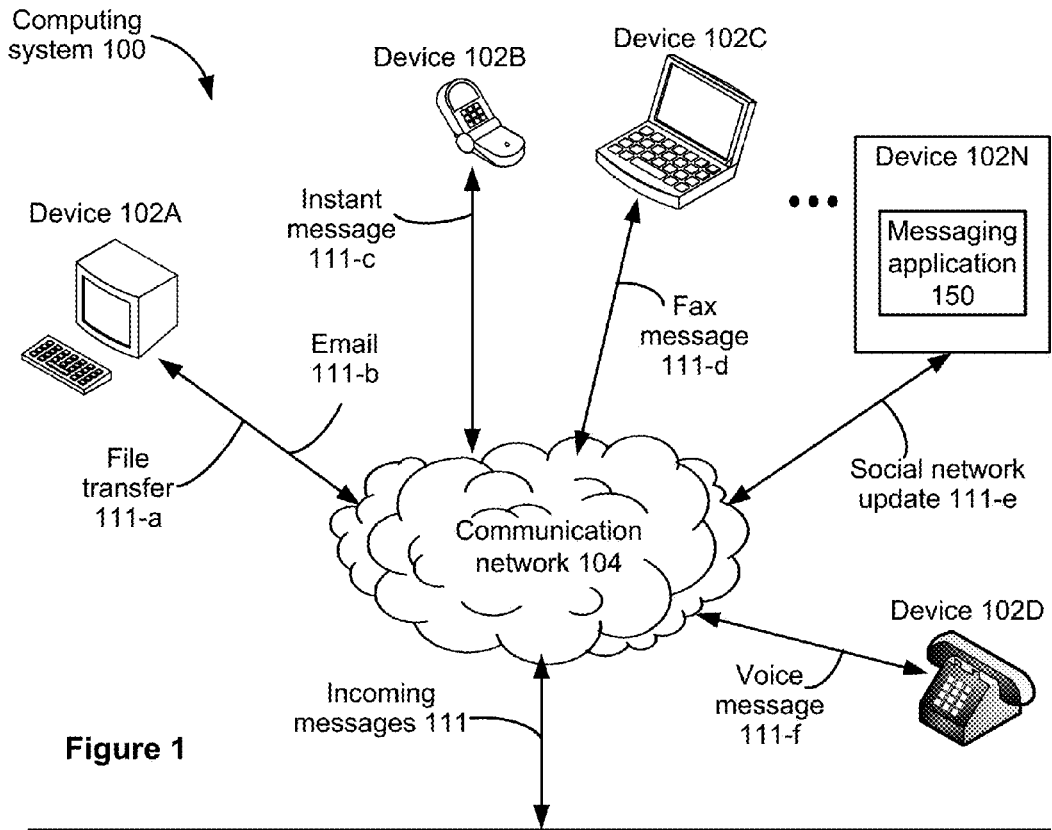
FIG. 1 is an example block diagram illustrating a computing system, in accordance with some implementations.
Figure 1:
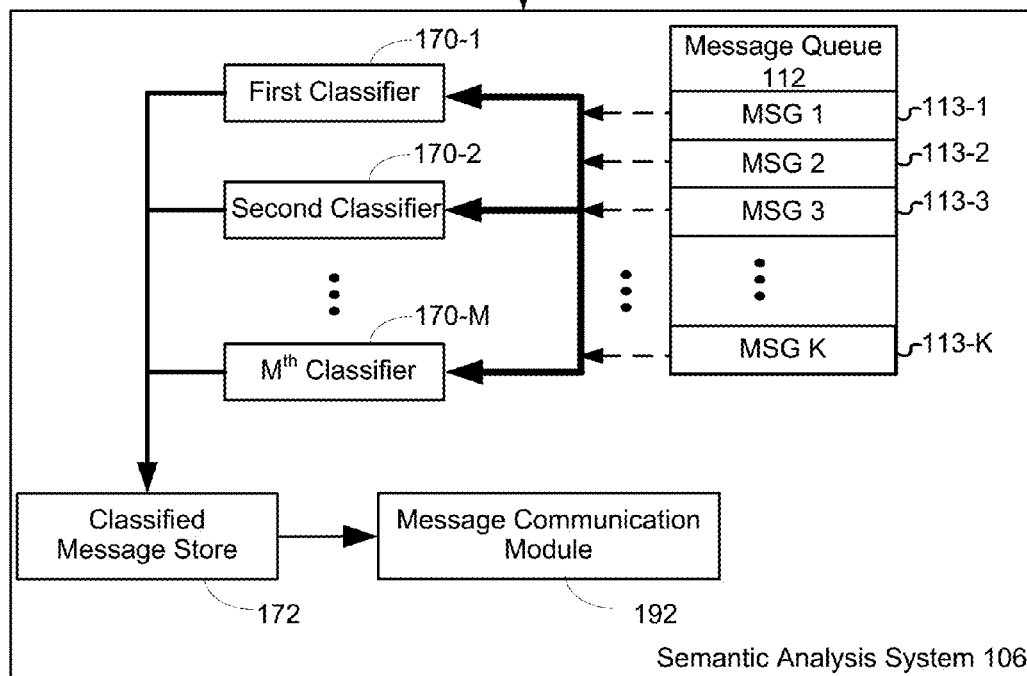

FIG. 1 is a block diagram illustrating a computing system 100, in accordance with some implementations. In some implementations, the computing system 100 includes one or more devices 102 (e.g., device 102A, 102B, 102C, 102D, . . . , and 102N), a communication network 104, and a semantic analysis system 106. In some implementations, a device 102 is a phone (mobile or landline, smart phone or otherwise), a tablet, a computer (mobile or otherwise), a fax machine, or an audio/video recorder.

In some implementations, a device 102 obtains an electronic message and transmits the electronic message to the semantic analysis system 106 for displaying with other electronic messages. For example, after determining that user Jack sends an electronic message to user Mary, the device 102 transmits the electronic message to the semantic analysis system 106, which processes the electronic message for display in a listing of electronic messages on the device associated with Mary. As part of this process, semantic analysis system 106 determines a message category of this message and communicates this message category along with the message.

In some implementations, an electronic message is a file transfer 111-$a$ (e.g., a photo, document, or video download/upload), an email 111-$b$, an instant message 111-$c$, a fax message 111-$d$, a social network update 111-$e$, or a voice message 111-$f$. In some implementations, an electronic message is contact information, an indication of a document, a calendar entry, an email label, a recent search query, a suggested search query, or a web search result.

In some implementations, a device 102 includes a messaging application 150. In some implementations, the messaging application 150 processes incoming and outgoing electronic messages into and from the device 102, such as an outgoing email sent by a user of the device 102 to another user, and a chat message by another user to a user of the device 102. In some embodiments the messaging application 150 is an e-mail application.

In some implementations, the communication network 104 interconnects one or more devices 102 with each other, and with the semantic analysis system 106. In some implementations, the communication network 104 optionally includes the Internet, one or more local area networks (LANs), one or more wide area networks (WANs), other types of networks, or a combination of such networks.

Figure 3:
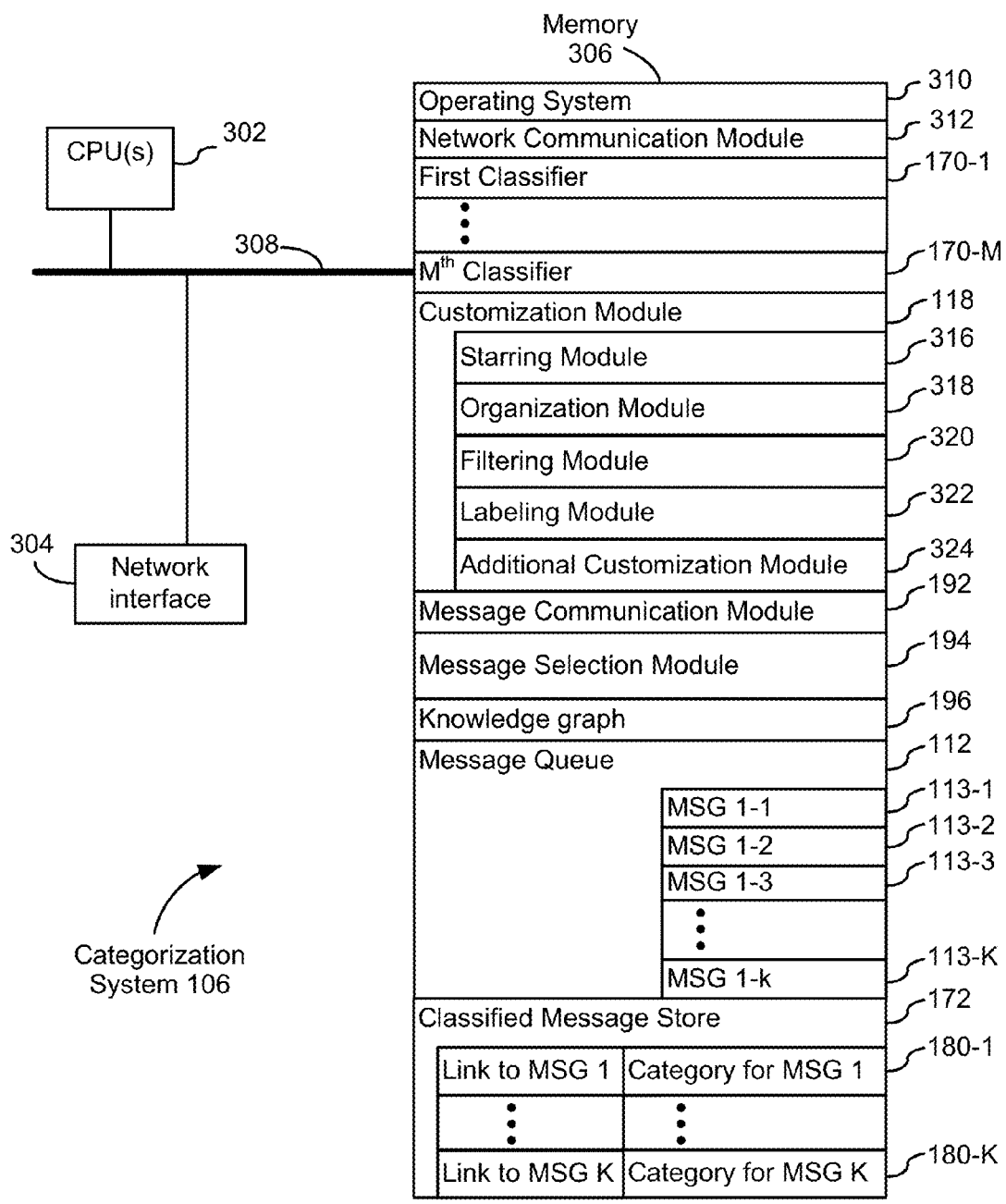
FIG. 3 is an example block diagram illustrating a categorization system in accordance with some implementations.

With reference to FIGS. 1 and 3, in some implementations, the semantic analysis system 106 includes any number of classifiers 170-1, ... 170-M. In some embodiments these classifiers act in concert to classify messages. For instance, in some embodiments, the output of several classifiers is combined for any given message in the message queue 112 and a classification decision is made for the message based on this. In some embodiments, there is a single classifier 170-1.

A message queue 112 includes a plurality of messages 113-1-1 to 113-1-K and a classified message store 172. In some implementations, the semantic analysis system 106 invokes one, some, or all of the classifiers 170 to classify each message in the plurality of messages 113-1-1 to 113-1-K thereby independently identifying an initial message category in a set of message categories for each respective message in the first plurality of messages.

One example of a set of message categories is {promotions, social, updates, forums, travel, finance and receipts}. Other examples of sets of message categories are any subset of the set {promotions, social, updates, forums, travel, finance and receipts}. Still other examples of sets of message categories are any subset of the set {promotions, social, updates, forums, travel, finance and receipts} combined with additional categories. For instance such additional categories are user defined in some embodiments. Each message category in the set of message categories requires that a message have certain characteristics. A message containing a reservation is classified as an "update" message in some embodiments. A message containing information about an event is classified as a "promotion" message in some embodiments. If a message queries a user to rate something, the message is classified as a "social" message in some embodiments. In some embodiments, there is any number of additional messages categories in the set of message categories.

By way of nonlimiting example, in some embodiments, messages that are likely to be categorized as "promotions" are newsletters, offers and other bulk messages. In some embodiments, messages that likely to be categorized as "social" are messages originating from a social networking website. In some embodiments, messages that likely to be categorized as "updates" are confirmations, bills, and receipt messages. In some embodiments, messages that are likely to be categorized as "forum" messages are messages from online groups, discussion boards, and mailing lists. In some embodiments, messages that likely to be categorized as "primary" are messages that do not fall into any of the other categories.

In some embodiments, classified message store 172 includes only a reference to where such messages is stored (e.g., a reference to message queue or some other location where the message is stored) and the classification of the message. Messages in message store 172 are distributed to the devices 102 associated with the recipients of these messages by message communication module 192.

In some implementations, the message queue 112 stores electronic messages awaiting analysis by the classifiers 170-1, ... , 170-M, such as MSG 1, MSG 2, MSG 3, ... and MSG K (FIG. 1, 113-1, ... , 113-K). In some implementations, the message queue 112 includes different types of electronic messages, such as a file transfer 111-$a$ (e.g., a photo, document, or video upload), an email 111-$b$, an instant message 111-$c$, a fax message 111-$d$, a social network update 111-$e$, a voice message 111-$f$, contact information, an indication of a document, a calendar entry, an email label, a recent search query, a suggested search query, or a search result (e.g., a web search result). In some embodiments, message queue 112 includes only a single type of electronic messages, e.g., one of file transfers, email, instant messages, fax messages, social network updates, voice messages, contact information, indications of documents, calendar entries, email labels, recent search queries, suggested search queries, or search results.

In some embodiments, any combination of the classifiers 170-1 through 170-M evolve during their respective time intervals. In other words, in such embodiments, the weights or other parameters of classifiers 170-1 through 170-M evolve (e.g., weights or other parameters associated with such classifiers will change, for instance through refinement) while they are processing messages. One type of information that is used to evolve these classifiers, in some embodiments, is user initiated message correction events.

Once messages have been classified, they are communicated to appropriate destination devices by message communication module 192.

Figure 2:
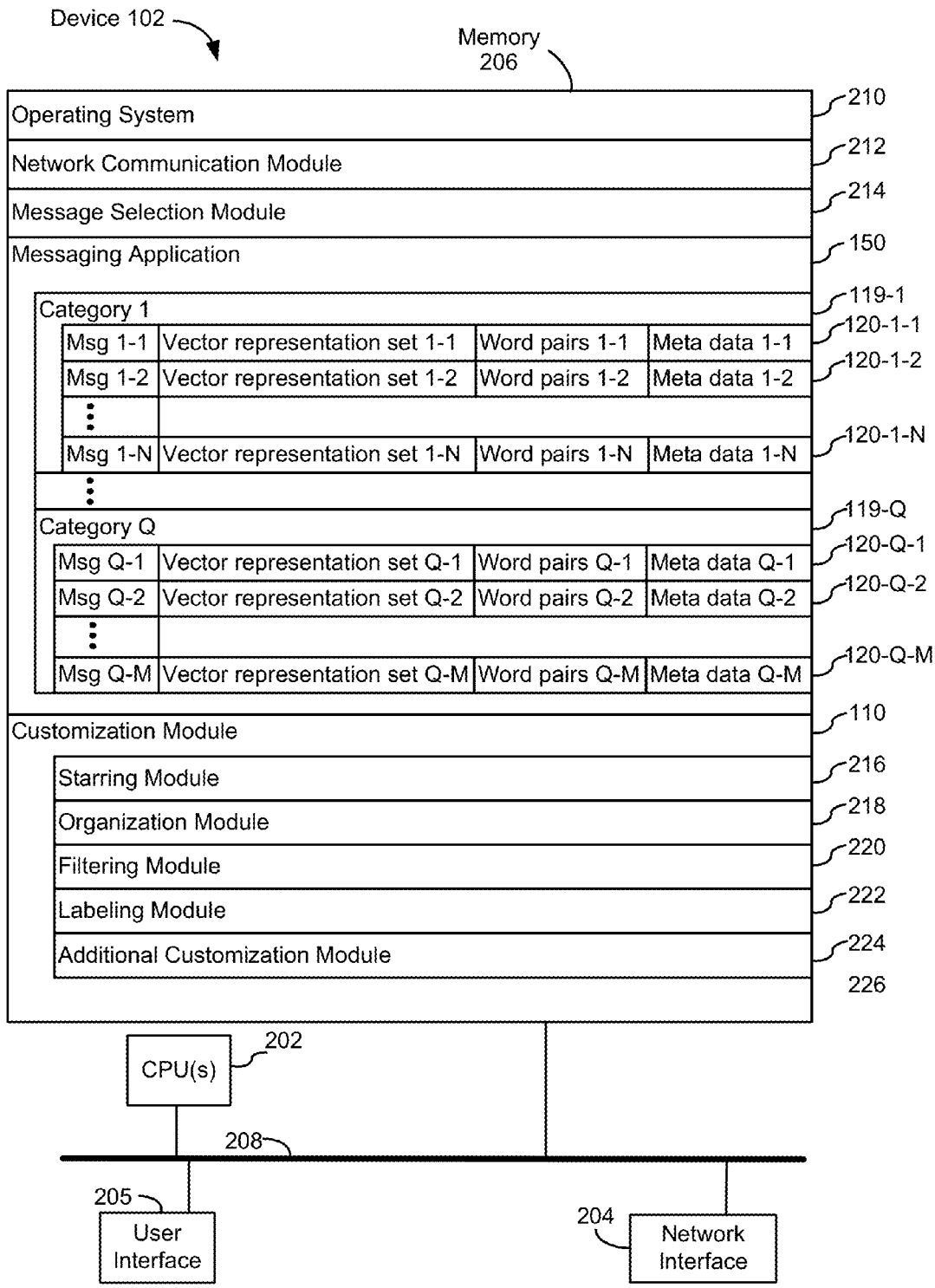
FIG. 2 is an example block diagram illustrating a computing device in accordance with some implementations.

FIG. 2 is a block diagram illustrating a computing device 102 in accordance with some implementations. The device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM, ROM, EEPROM, flash memory, CD-ROM, digital versatile disks (DVD) or other optical storage, magnetic cassettes, magnetic tape, magnetic disk storage or other magnetic storage devices, other random access solid state memory devices, or any other medium which can be used to store desired information; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the device 102 with other devices (e.g., the semantic analysis system 106 and the devices 102B ... 102N) via one or more network interfaces 204 (wired or wireless), or the communication network 104 (FIG. 1);
- a message selection module 214 for identifying messages that are similar to a message that has been selected by a user;

a messaging application 150 for processing and displaying incoming and outgoing electronic messages, including messages 120-1-1 through 120-1-N of category 119-1, ..., messages 120-Q-1 through 120-Q-N of category 119-Q, and so forth, where 1, 2, ..., Q, are the message categories in a set of message categories; and a customization module 110.

In some embodiments, the customization module 110 includes one or more of the following: a starring module 216 to allow a user to star a message for inclusion in a priority category; an organization module 218 to allow a user to move a message from one category to another (e.g., by dragging and dropping); a filtering module 220 for allowing a user to specify a category rule for a message, and a labeling module 222 allowing a user to customize clusters for messages (by removing system created categories and/or creating additional categories.) Furthermore, the customization module 118 optionally includes one or more additional customization modules 224 for providing further user customization of categorization rules.

In some implementations, the user interface 205 includes an input device (e.g., a keyboard, a mouse, a touchpad, a track pad, and a touch screen) for a user to interact with the device 102.

In some implementations, the labeling module 222 labels an electronic message using a flag in accordance with which category the electronic message has been assigned. For example, after an email is assigned to both a "Travel" category and a "Promotion" category, the labeling module 222 assigns both the label "Travel" and the label "Promotion" to the electronic message. These approaches are advantageous, because message labels may simplify searches and selective retrievals of electronic messages, e.g., electronic messages may be searched, and retrieved, both using labels.

As illustrated in FIG. 2, for each respective message 120, there is stored, as vector representation set, continuous vector representations of a set of words in the respective message. Examples of tools that prepare such continuous vector representations of words are the continuous bag-of-words and skip-gram architectures implemented in the word2vec project available at code.google.com/p/word2vec.

In some embodiments, the words in a respective vector representation set are exclusively taken from the subject header of the corresponding message 120.

In some embodiments, the words in the vector representation set are exclusively taken from the message body in the corresponding message. For messages having message bodies of appreciable length, various embodiments of the disclosed systems and methods provide advantageous filtering tools so that the words populated in the vector representation set for a message have semantic meaning and to prevent overloading such vector representation set. For instance, in some embodiments, a subset of words or phrases in a message body of the message is selected for the corresponding vector representation set. Moreover, for at least one respective word or phrase in this subset, the respective word or phrase is replaced with a synonym for the respective word or phrase obtained from the knowledge graph 196 of FIG. 3, thereby including the synonym for the respective word or phrase in the first set of words in place of the respective word or phrase. An example of knowledge graph 196 is described at googleblog.blogspot.co.uk/2012/05/introducing-knowledge-graph-things-not.html, accessed Oct. 31, 2014.

As further illustrated in FIG. 2, in some embodiments, the vector representation set for messages is kept informative by relying upon word pairs found in the corresponding message body of the respective message. For instance, in some embodiments, certain verb-object and verb-subject pairs are extracted from each sentence in the respective message (e.g. extracting reset-password from "Please reset your password"). Such word pairs provide a more information dense basis for comparing the respective messages to other messages in order to find similar messages.

In some embodiments, both the synonym replacement and the word pair techniques are used to identify suitable words for a vector representation set. In some embodiments, words from the subject line, synonym replacement, and word pair from sentences in the message body are used to identify suitable words for a vector representation set.

As further still illustrated in FIG. 2, in some embodiments, there is further stored, for each respective message 120, meta-information extracted from the respective message. Nonlimiting examples of meta information include, but is not limited to message sender identity, message recipient identity, message category, message date, and message sender domain, either alone or in any combination.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above. In some embodiments, the device 102 is a thin client which does not include one or more of the customization modules 118 (e.g., the starring module 216; organization module 218; filtering module 220; labeling module 222, etc), and as such categorization customization is performed in part or in whole on the semantic analysis system 106.

FIG. 3 is a block diagram illustrating a semantic analysis system 106 in accordance with some implementations. The semantic analysis system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

an operating system 310, which includes procedures for handling various basic system services and for performing hardware dependent tasks;

a network communication module (or instructions) 312 for connecting the semantic analysis system 106 with other devices (e.g., the devices 102) via the one or more network interfaces 304 (wired or wireless), or the communication network 104 (FIG. 1);

classifiers 170-1, . . . , 170-M for conducting an analysis of a first plurality of electronic messages thereby independently identifying an initial message category in a set of message categories for each respective message in the first plurality of messages;

an optional customization module 118 for allowing a user to create and/or edit categorization rules in accordance with various categorization actions;

a message communication module 192 for delivering a first plurality of categorized messages to a plurality of recipients 102 with a designation of the message category of each respective message in the first plurality of messages, as respectively determined by the classifiers 170-1, . . . , and/or 170-M;

a message selection module 194 for identifying messages that are semantically similar to a message identified by a user;

a knowledge graph 196 that provides synonyms for words or phrases;

a message queue 112 for storing electronic messages awaiting processing by the first classifier 170-1 or the second classifier 170-1, e.g., MSG 1-1, MSG 1-2, MSG 1-3, . . . and MSG 1-k (113-1-1, . . . , 113-1-k) for processing by the first classifier 170-1 and e.g., MSG 2-1, MSG 2-2, MSG 2-3, . . . and MSG 1-n (113-2-1, . . . , 113-2-n) for processing by the second first classifier 170-2; and a classified message store 172, which includes a message category 180 in the set of message categories for each respective message analyzed by the classifiers 170 as well as either the respective message or a link to the respective message.

In some embodiments, the customization module 118 includes one or more of the following: a starring module 316 to allow a user to star a message for inclusion in a priority category; an organization module 318 to allow a user to move a message from one category to another (e.g., by dragging dropping), a filtering module 320 for allowing a user to specify a category rule for a message, and a labeling module 322 allowing a user to customize categories for message (by removing system created categories and/or creating additional categories.) Furthermore, the customization module 118 optionally includes one or more additional customization modules 324 for providing further user customization.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Although FIGS. 2 and 3 show a "device 102" and a "semantic analysis system 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4:
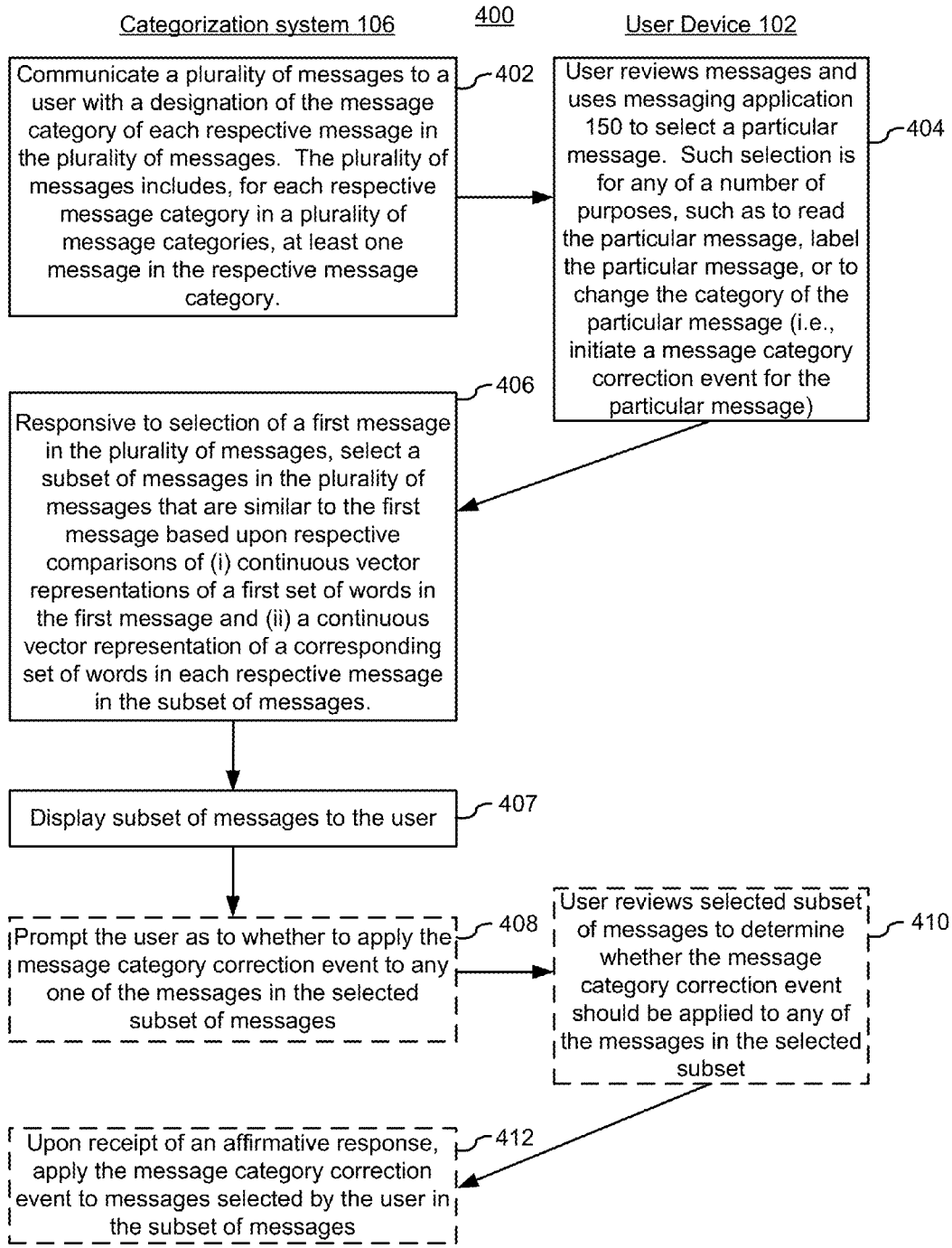
FIG. 4 illustrates a method of identifying messages in accordance with some implementations.

FIG. 4 is a flow chart illustrating a method for identifying messages that are semantically similar to a selected message in accordance with some implementations. In accordance with the disclosed systems and methods, a plurality of messages is communicated to a user with a designation of the message category of each respective message in the plurality of messages. The plurality of messages includes, for each respective message category in a plurality of message categories, at least one message in the respective message category (402). In some embodiments, one or more of the classifiers 170 classifies messages into the set of message categories using any of a number of possible techniques. In one example, one or more classifiers 170 examine the contents of messages. If the message contains words or phrases that are usually associated with a particular category in the set of categories, the message classifier classifies the message in that particular category. In another example, a message classifier compares the contents of a message to be classified to previously classified messages. If the unclassified message is similar to one or more previously sent messages, the message classifier classifies the message into the same category as the previously sent messages.

Figure 5:
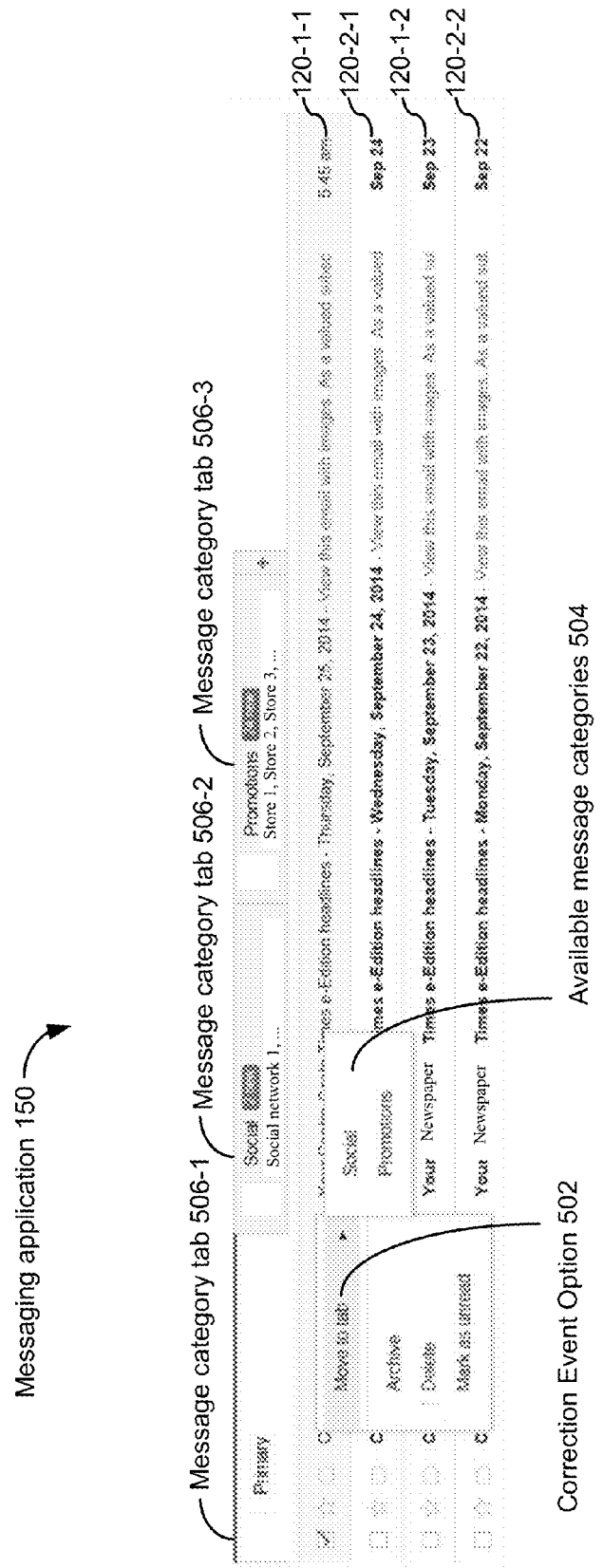
FIG. 5 illustrates a partial user interface of enacting a message category correction event in accordance with some embodiments.

Next, a user reviews incoming messages and selects a message using the messaging application 150 of the user device 102 associated with the user (404). For instance, this selection could be for a specific purpose, such as to simply read the message, label the message, and/or to initiate a message category correction event for the message. FIG. 5 illustrates a portion of the interface of an exemplary messaging application 150 running on a user device 102. The exemplary messaging application receives the first plurality of messages and arranges the messages into the tabs 506 that correspond to message categories. For example, those messages in the first plurality of messages that have been classified as "primary" by the classifier(s) 170 are placed in message category tab 506-1, those messages in the first plurality of messages that have been classified as "social" by the classifier(s) 170 are placed in message category tab 506-2, and those messages in the first plurality of messages that have been classified as "promotions" are placed in message category tab 506-3. In FIG. 5, tab 506-1 is featured, meaning that the messages 120 in the category represented by tab 506-1 (primary) are listed in a specified order. In the example illustrated in FIG. 5, this order is chronological, but other ordering is available and/or possible.

FIG. 5 further illustrates how a recipient can initiate a message category correction event. The user selects a listed message (e.g., message 120-1), for example by right-clicking on the message with a mouse, thereby bringing up a menu that includes correction event option 502. By selecting correction event option 502, the user can change the category of the message to any of the other message category in a set of message categories using selection panel 504 (available message categories). In some embodiments, the set of message categories is promotions, social, updates, and forums. In some embodiments, the set of message categories is primary, promotions, social, updates, and forums.

Returning to FIG. 4, responsive to selection of a first message in the plurality of messages, a subset of messages in the plurality of messages that are similar to the first message are selected based upon respective comparisons between (i) a continuous vector representation of a first set of words in the first message and (ii) a continuous vector representation of a corresponding set of words in each respective message in the subset of messages (406). In some embodiments, this selection is facilitated by the data structures illustrated in FIG. 2, where, for each respective message there is a corresponding vector representation set for each message 120. In some embodiments, such a vector representation set for a respective message is created at a time before the user selects the first message. As such, the comparisons (406) make use of a vector space model or a term vector model for each respective message. A vector space model is an algebraic model for representing messages as vectors of identifiers, such as, for example, index terms. Documents (the other messages $d_j$ in the first plurality of messages) and the query q (the message that has undergone a message categorization correction event) are represented as vectors:

$d_j=(w_{1,j}, w_{2,j}, \ldots, w_{t,j})$
$q=(w_{1,q}, w_{2,q}, \ldots, w_{n,q})$ Each dimension corresponds to a separate term. If a term occurs in the message, its value in the vector is non-zero. Several different ways of computing these values, also known as (term) weights, have been developed, such as tf-idf weighting. Here, the word "term" typically means single words, or word pairs. Relevance rankings of messages against the first (query) message can be calculated, using the assumptions of document similarities theory, by comparing the deviation of angles between each document vector and the original query vector of the message that was selected by the user to undergo a message category correction event.

In some embodiments, the terms in the vector representation set of the respective message are exclusively certain identified words in the subject header of the respective message 120.

In some embodiments, a term in the vector representation set of the respective message is selected by identifying a subset of words or phrases in a message body of the first message and, for at least one such respective word or phrase in the message body, replacing the respective word or phrase with a synonym for the respective word or phrase obtained from a knowledge graph, thereby including the synonym for the respective the terms in the vector representation set for a respective message are exclusively certain words in the message body in the respective message. For instance, consider a message that includes the sentence "The Lakers game was great last night." Here, the word "Lakers" is identified by the knowledge graph as being associated with the more semantically meaningful term "Los Angeles Lakers." As such, the term "Los Angeles Lakers" is used in the vector representation set for the respective message even though the respective message does not include this term. As this example shows, in some embodiments, it is possible that, in some embodiments, at least some of the terms in the vector representation set for a message are not found in the message.

Another method used in some embodiments of the systems and methods of the present disclosure to improve the semantic meaning of the vector representation set of the respective message is to parse the message body of the message into sentences and then to extract verb-object and verb-subject pairs from sentences in the message body for use in the vector representation set. This alleviates the problem that, in many instance, there are too many words in the message body to use all the words in the vector representation set. In some embodiments, the terms in the vector representation set for a respective message are exclusively word pairs found in the respective message. For instance, in some embodiments, certain verb-object and verb-subject pairs are extracted from each sentence in the respective message (e.g. extracting reset-password from "Please reset your password"). Such word pairs provide a more information dense basis for comparing the respective messages to other messages in order to find similar messages. Accordingly, in some embodiments, such word pairs are included as terms in the vector representation set for the respective messages.

In some embodiments, meta-information (metadata) is also extracted from the respective messages for use in identifying similar message. Nonlimiting examples of meta information include, but are not limited a determination as to whether a user associated with the message communicates directly with a certain other user, a message sender identity, a message recipient identity, a message category, a message date, a message sender domain, and a personal contact of the user associated with the message.

Additional examples of metadata are any of the fields found in the header of the protocol under which the electronic message 113 is governed. For instance, if the electronic message is governed by the Simple Mail Transfer Protocol (See Request for Comments: 4321, dated October 2008, http://tools.ietf.org/html/rfc5321, last accessed Nov. 6, 2014, which is hereby incorporated by reference), than any of the message header sections or the elements contained therein, as referenced in companion document Request for Comments: 5322, dated October 2008, http://tools.ietf.org/html/rfc5322, last accessed Nov. 6, 2014 ("RFC 5322"), which is hereby incorporated by reference, can be extracted for use in the disclosed systems and methods. RFC 5322 details and defines metadata such as address, mailbox, name-addre, angle-addre, group, displayname, mailbox-list, address-list, group-list, addr-spec, localpart, domain, domain-literal, and dtext as exemplary header fields, any of which can be used as metadata in the disclosed systems and methods. Moreover, in some embodiments, the message category assigned (or not assigned) by a classifier 170 to a message 113 (e.g., social, promotions, updates, forums) constitute metadata in some embodiments. Moreover, in some embodiments, actions taken (or not taken) by a user on a message can constitute metadata in some embodiments. For instance, respective events (taken or not taken) such as reading an electronic message, replying to the electronic message, or recategorizing the electronic message can each constitute metadata for the electronic message. Further still, system labels that are (or are not) applied to a message can constitute metadata for a message. Examples of system labels include, but are not limited to inbox, starred, important, chats, sent mail, drafts, all mail, spam, and trash. Further still, social (circle) labels (e.g., friends, family, acquaintances, following, popular on social media, clients) that are (or are not) applied to a message can constitute metadata for the respective message.

In preferred embodiments, when metadata is obtained from a respective message, the metadata is not combined with the vector representation set. Thus, in an illustrative embodiment, a vector representation set for a message is built using select words from the corresponding message. These select words are determined from the message in any of a number of ways. In some embodiments these select words are from the message subject line. In some embodiments these select words are identified word pairs in respective sentences in the message body. In some embodiments these select words are synonyms of words in the message body identified by use of a knowledge graph. In some embodiments, these select words are words identified in the message using any combination of the aforementioned techniques. A continuous vector representation of the vector representation set for the message is then compared to the continuous vector representation of the vector representation set for other messages, by, for example, taking the cosine product of two respective continuous vector representations.

Separate and apart from this continuous vector representation analysis, the metadata extracted from respective messages, typically expressed in binary form, is also compared. For example, in some embodiments a vector of the metadata from one message is compared to a vector of the metadata from another message by taking the dot product of the respective vectors of the two messages. Table 1 below illustrates how metadata for each of a number of messages can be constituted into respective vectors for the messages.

TABLE 1

Illustration of message metadata arrayed as a vector

| Metadata Element | Message 113-1 | Message 113-2 | Message 113-3 | Message 113-4 | ... | Message 113-W |
|---|---|---|---|---|---|---|
| Message Sender 1 | 1 | 0 | 1 | 0 | ... | 1 |
| Message Sender 2 | 0 | 1 | 0 | 0 | ... | 0 |
| . | . | . | . | . | ... | . |
| Message Sender N | 0 | 0 | 0 | 0 | ... | 0 |
| Label 1 | 1 | 0 | 1 | 0 | ... | 1 |
| Label 2 | 0 | 1 | 0 | 0 | ... | 0 |
| . | . | . | . | . | ... | . |
| Label Q | 0 | 0 | 0 | 1 | ... | 0 |
| Group 1 | 1 | 1 | 0 | 0 | ... | 0 |
| Group 2 | 0 | 0 | 0 | 1 | ... | 0 |
| . | . | . | . | . | ... | . |
| Group 3 | 0 | 0 | 0 | 0 | ... | 0 |
| Message Opened | 1 | 1 | 0 | 1 | ... | 1 |
| Message Replied To | 0 | 1 | 0 | 1 | ... | 0 |
| Message Category 1 | 1 | 0 | 0 | 0 | ... | 1 |
| Message Category 2 | 0 | 1 | 0 | 1 | ... | 0 |
| . | . | . | . | . | ... | . |
| Message Category P | 0 | 0 | 1 | 0 | ... | 0 |
| . | . | . | . | . | ... | . |

In Table 1, unique metadata elements are arranged by row and unique messages 113 are arranged by column. In Table 1, each possible message sender identity is a separate element. If a respective message originated from a given sender, the element for the sender for the respective message is set to "1" and, otherwise "0". In Table 1, each possible message label is a separate element. If a respective message has been assigned a label, the element for the label for the respective message is set to "1" and, otherwise "0". In Table 1, each possible group is a separate element. If a respective message includes the group designation in its message header, the element for the group for the respective message is set to "1" and, otherwise "0". In Table 1, each possible message action (e.g., message opened, message replied to, message recategorized by user) is a separate element. If a respective message has undergone the action, the element for the action for the respective message is set to "1" and, otherwise "0". In Table 1, each possible message category is a separate element. If a respective message has been categorized by the message classifier 170 (or by the user) to a particular category, the element for the particular category for the respective message is set to "1" and, otherwise "0". In some embodiments, message elements are assigned in the reverse order, that is they are assigned a "0" if they have the element and "1" otherwise. Furthermore, it will be appreciated that Table 1 provides just an example of the types of metadata elements that are used to constitute a vector of metadata for a respective message in some embodiments. In other embodiments, some or none of the elements described in Table 1 are used to build a metadata vector. However, using Table 1 as a guide, it will be seen that the metadata vector for message 113-1 is {1, 0, . . . , 0, 1, 1, . . . , 0, 1, 0, . . . , 0, 1, 0, 1, 0, . . . , 0, . . . }.

As another example, in some embodiments a vector of the metadata from one message is compared to a vector of the metadata from another message by calculating the Jaccard distance of the two vectors. The Jaccard distance is described in Levandowsky, 1971, "Distance Between Sets," Nature 234 (5): 34-35, which is hereby incorporated by reference herein in its entirety. In some embodiments this Jaccard distance is weight averaged with the calculated continuous vector representation of the respective messages.

In still another example, in some embodiments a vector of the metadata from one message is compared to a vector of the metadata from another message by calculating the Jaccard index of the two vectors. In some embodiments this Jaccard index is weight averaged with the calculated continuous vector representation of the respective messages.

In some embodiments, a final assessment of the similarity of two messages is determined as a linear combination of the continuous vector representation comparison of the two messages and the metadata comparison of the two messages. In some embodiments the continuous vector representation is weighted by a first weight and the metadata comparison is weighted by a second weight, where the first weight and the second weight are the same or different. In some embodiments, other bases for message similarity are included as additional components of this linear combination.

As described above, the vector representation set of each message in the plurality of messages is used (either alone or in combination with the metadata comparison) to identify those messages in the plurality of messages that are most similar to the message identified by a user for a message category correction event. There is no requirement that such identified messages be in the same message category as the identified message. For instance, if the initiating message is categorized, through a message categorization correction event, from "updates" to "social", there is no requirement that the messages identified as being similar to this initiating message be categorized as "updates" in some embodiments.

In some embodiments, the selected subset of messages comprises the top N number of similar messages, where N is some predetermined integer. In some embodiments, the selected subset of messages comprises all those messages that satisfy a predetermined similarity criterion using a similarity metric that makes use of the continuous vector representations of the messages.

In step 407 the subset of messages are displayed to a user.

Figure 6A:
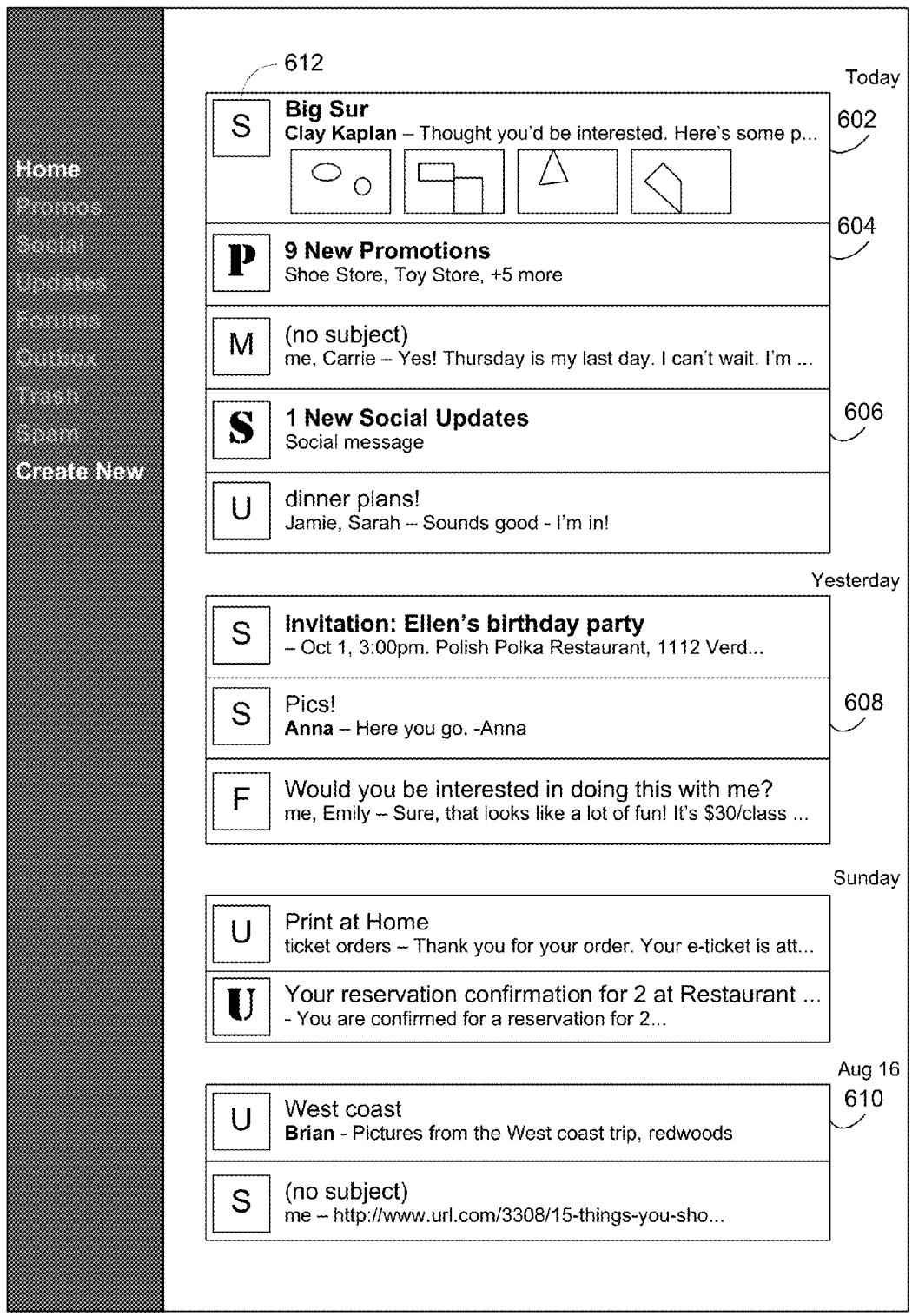
FIGS. 6A, 6B, 6C and 6D illustrate a user interface for identifying semantically similar messages in accordance with some embodiments.

In optional embodiments where the user selection of a message was the result of a message category correction event, the user is prompted as to whether to apply the message category correction event to any one of the messages in the selected subset of messages (408). This is illustrated in FIGS. 6A through 6D. In FIG. 6A, a user interface is shown for a messaging application 150, comprising a listing of electronic messages (e.g., in an email inbox). The listing of electronic messages is shown to comprise at least two message clusters, cluster 604 and cluster 606. Cluster 604 is a group of electronic messages having a collective association, namely promotional material (e.g., advertisements for retail sales, newsletters from stores). Cluster 606 is a group of electronic messages having a collective association, namely social updates. FIG. 6A further illustrates several individual messages and, for each such message, a message categorization, for instance: message 602 (social), message 608 (social), and message 610 (updates). In the exemplary message application 150, the message categorization of each respective message is indicated by an icon. For instance, the message categorization for message 602 is indicated by the icon 612, where the character "S" in the message stands for "social."

Figure 6B:
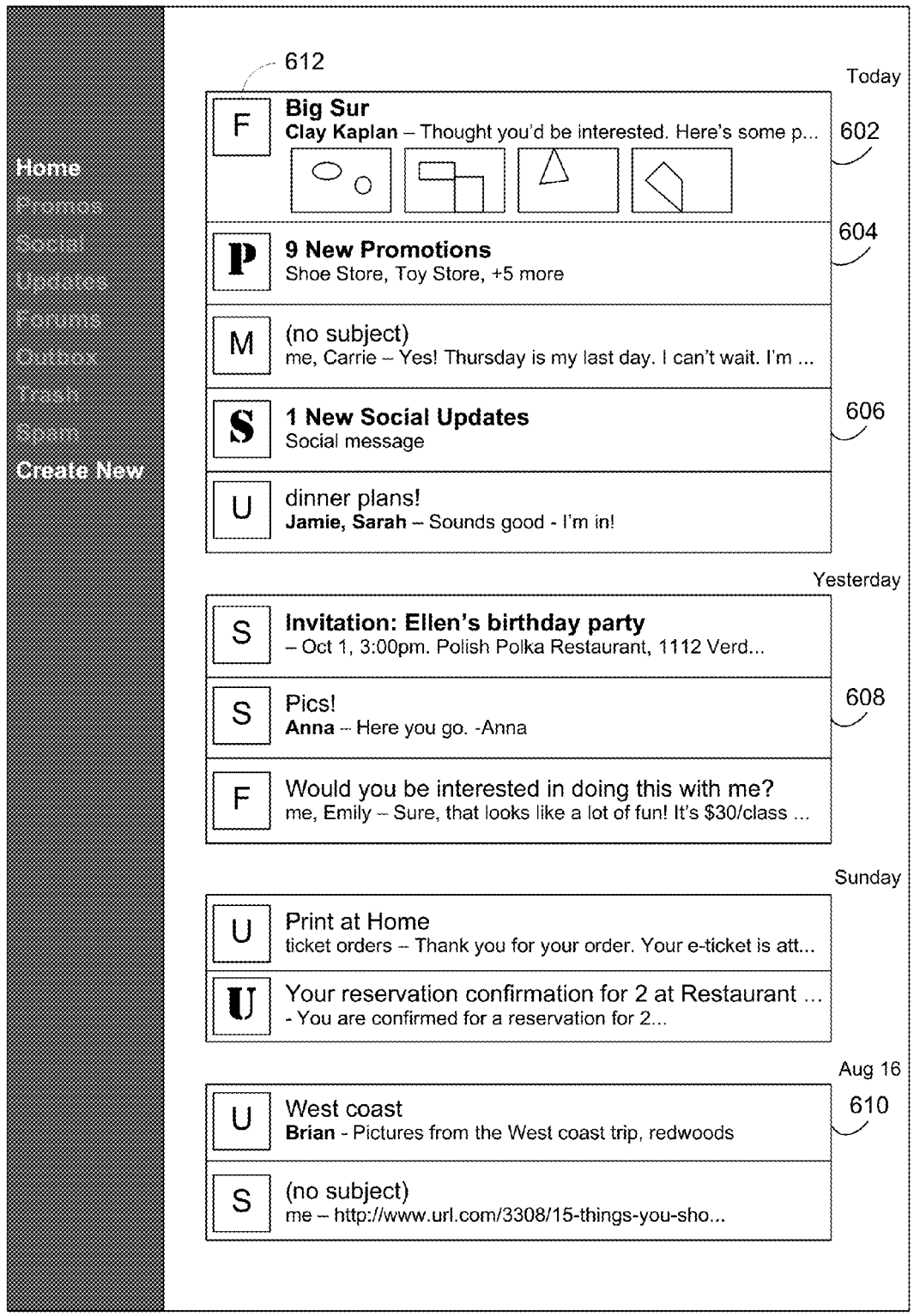
Figure 6C:
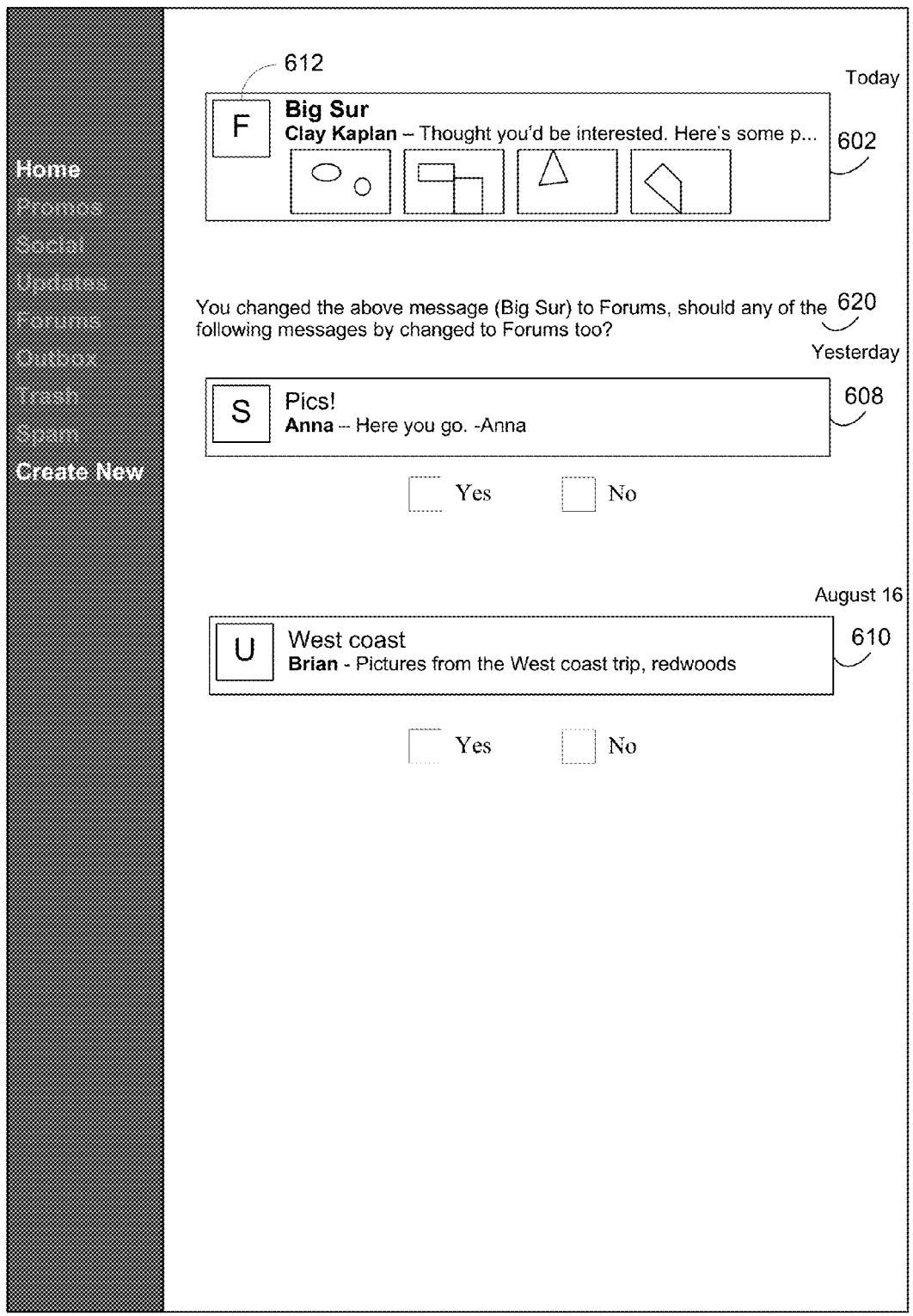
Figure 6D:
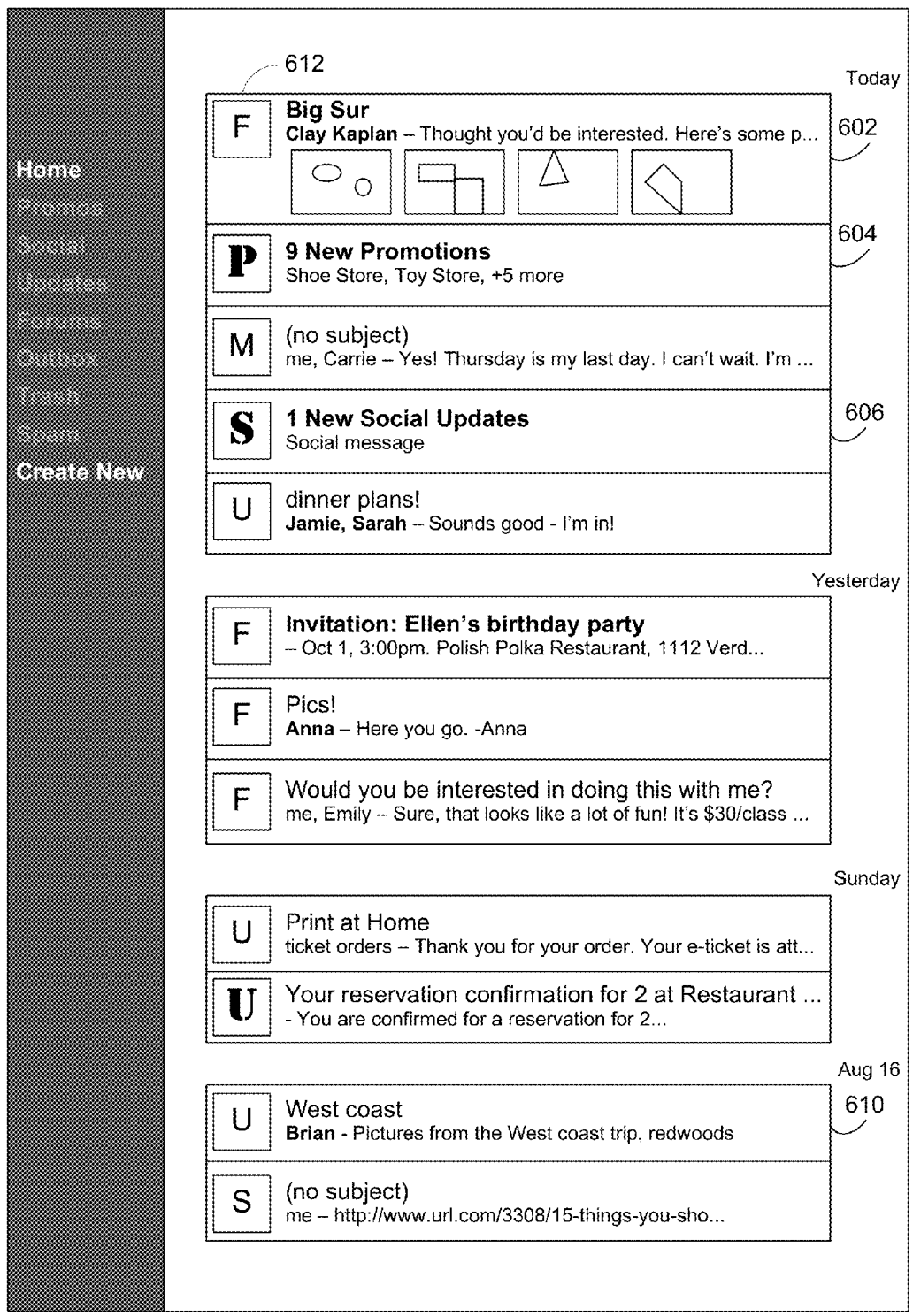

In FIG. 6B it is seen that the user has changed the message category of message 602 from "social" to "forums". This is documented by the change in icon 612 from "S" in FIG. 6A to "F" in FIG. 6B. FIG. 5 illustrates an exemplary interface that provides the user with a way to implement such message category correction events. Responsive to the message category correction event for message 602, a subset of messages that are similar message 602 are selected based upon respective comparisons between (i) a continuous vector representation of a first set of words in message 602 and (ii) a continuous vector representation of a corresponding set of words in each respective messages associated with the user (e.g., in the user's in box). Accordingly, the vector representation set of each candidate message is compared to the vector representation set of message 602. In some embodiments, the vector representation set includes continuous vector representations of any combination of (i) select words from the message header, (ii) synonyms of words from the message body that are found in a knowledge graph and (iii) word-pairs extracted from sentences in the respective message. Turning to FIG. 6C, the subset of messages that are selected based on the comparisons of continuous vector representations to message 602 is shown. They are messages 608 and message 610. The illustrative user interface of FIG. 6C allows a user to review the selected subset of messages to determine whether the same message category correction event should be applied to any of the messages in the selected subset (410). Upon receipt of an affirmative response, the message category correction event is applied to messages selected by the user in the subset of messages (412). For example, turning to FIG. 6D, it is seen that the user chose to apply the message category correction event to message 608 but not message 610.

Figure 7:
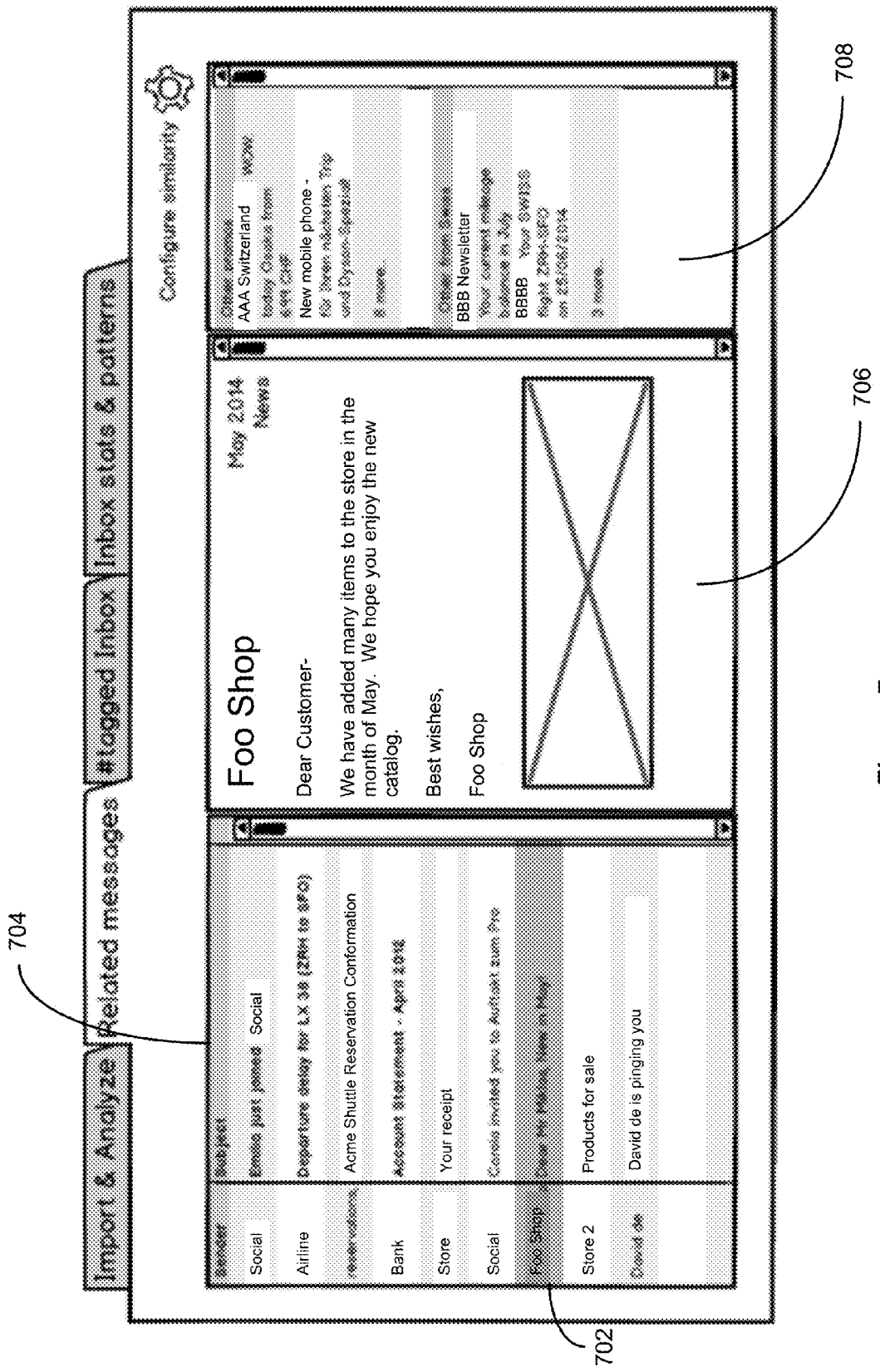
FIG. 7 illustrates another user interface for identifying semantically similar messages in accordance with some embodiments.

FIG. 7 illustrates a different embodiment of messaging application 150 in which a user has selected a message 702 from a plurality of messages 704. The full text of the selected message 702 is provided in panel 706. Messages that have been identified by the systems and methods of the present disclosure are listed in panel 708. This allows the user to quickly identify messages that may be related to a given message even if such other messages are in different categories. As such, the presentation of a subset of messages that are similar to a message identified by the user provides an advantageous and improved method of user navigation. For instance, as exhibited by panel 708 in FIG. 7, the user is able to quickly navigate to messages that are specifically related to a particular message selected by the user. In typical embodiments, there is no requirement that these related messages be in a common category as the message selected by the user. Moreover, in typical embodiments, there is no requirement that these related messages be in a common thread or conversation as the message selected by the user. Advantageously, in some embodiments, the messages that are deemed to be similar to the message identified by the user are recategorized into a new category. In some such embodiments, a classifier 170 is updated to include an ability to categorize future incoming messages intended for the user into this new category. Moreover, with reference to FIG. 7 as an example of displaying the subset of messages, in some embodiments displaying similar messages is useful not only for navigation but also for providing context. For example, there might be numerous messages about a particular project to different recipient groups with different subjects. As such, the disclosed systems and methods advantageously provide a way to remind the user of those other messages when reading a new message.

Figure 8A:
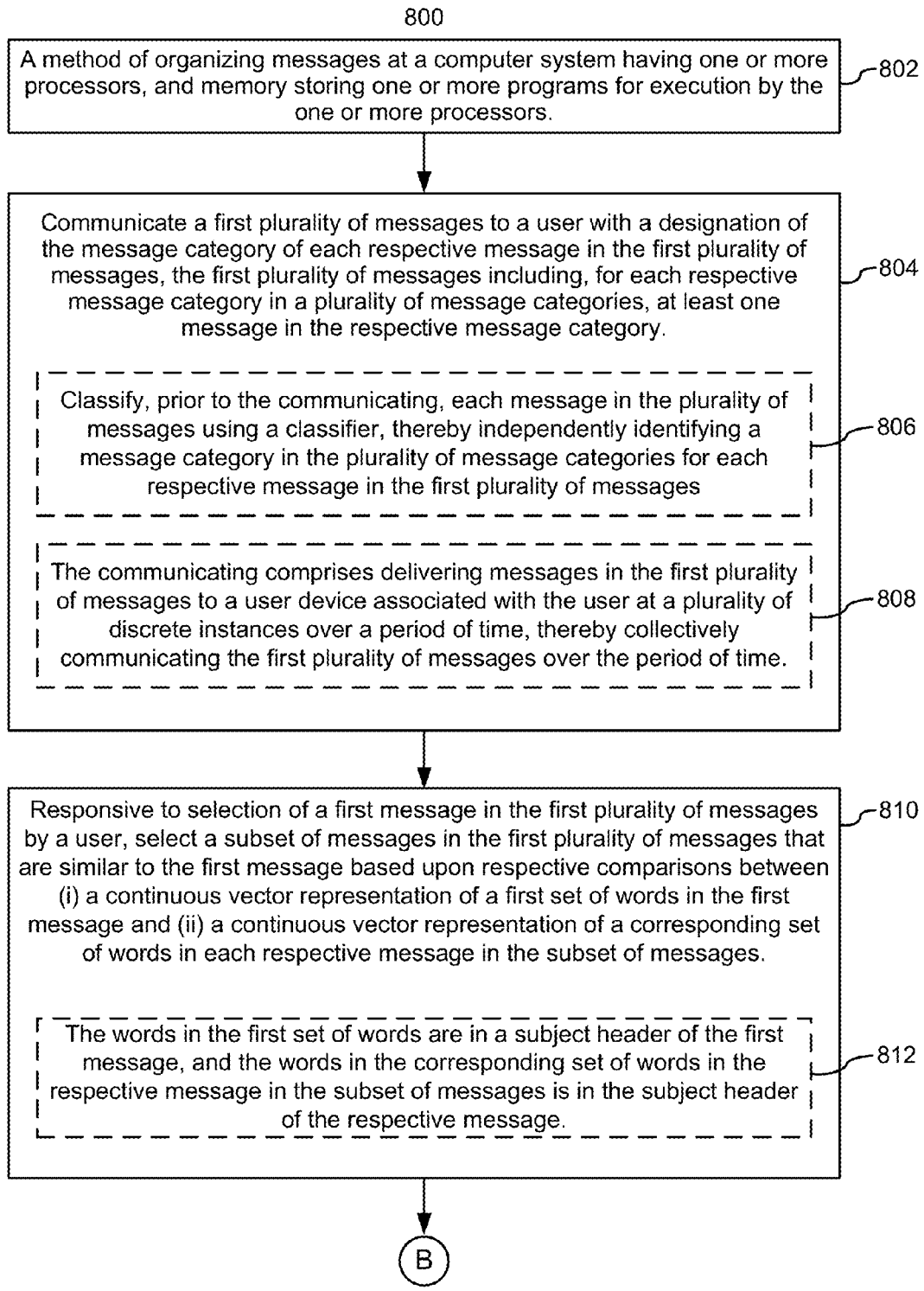
FIGS. 8A and 8B illustrate an example method for identifying semantically similar messages in accordance with some implementations.
Figure 8B:
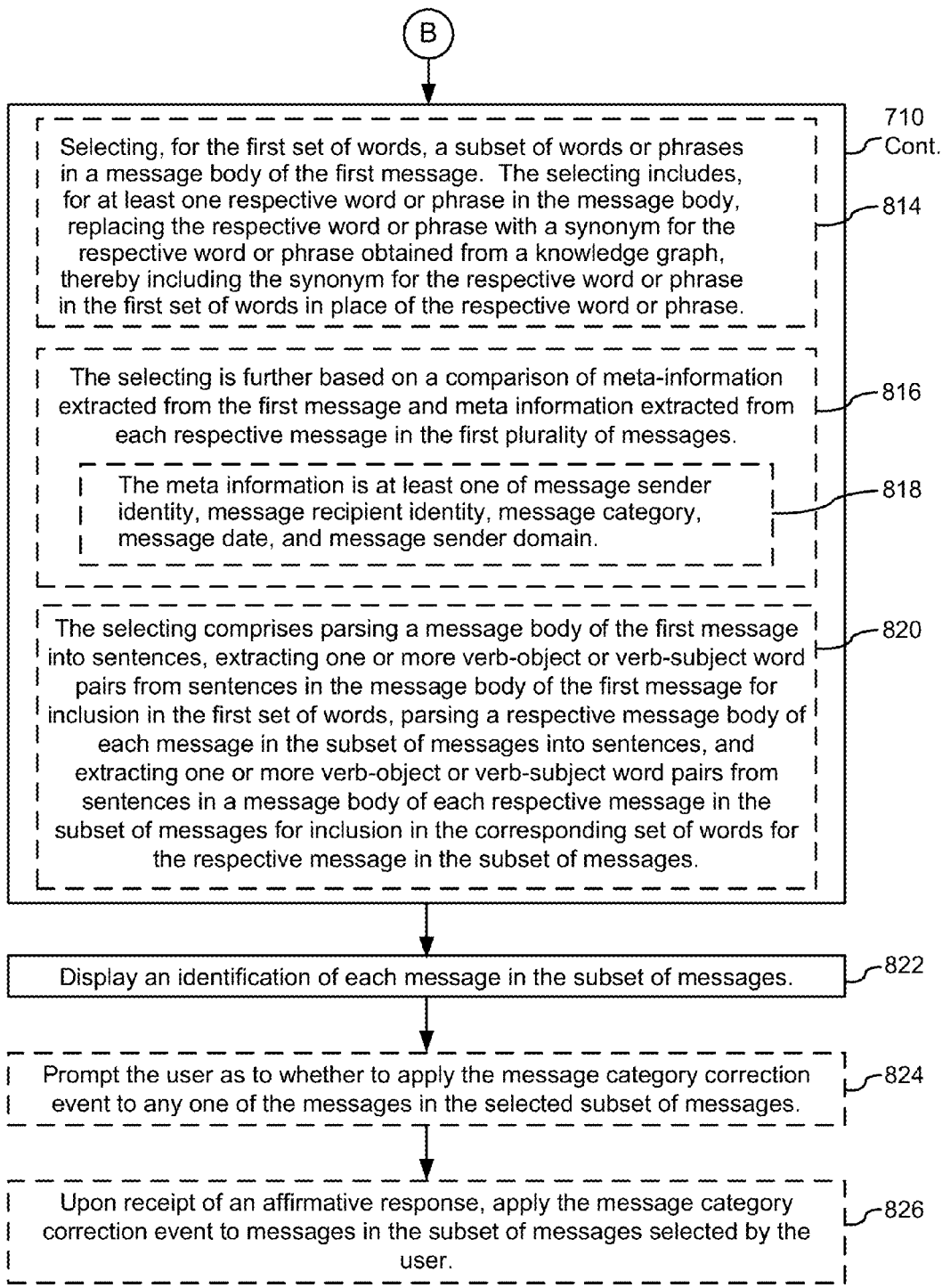

FIG. 8 is a flow chart illustrating a method of identifying semantically similar messages at a computer system having one or more processors, and memory storing one or more programs for execution by the one or more processors (802). A first plurality of messages is communicated to a user with a designation of the message category of each respective message in the first plurality of messages. Typically, this involves forwarding messages to one or more devices 102 associated with a user from the semantic analysis system 106. The first plurality of messages includes, for each respective message category in a plurality of message categories, at least one message in the respective message category (804). An exemplary plurality of message categories is the set {personal, promotions, social, updates, forums, travel, finance, and receipts}. In some embodiments, each message in the plurality of messages is classified using a classifier, thereby independently identifying a message category in the plurality of message categories for each respective message in the first plurality of messages (806). In some embodiments, the communicating comprises delivering messages in the first plurality of messages to one or more user devices associated with the user at a plurality of discrete instances over a period of time, thereby collectively communicating the first plurality of messages over the period of time (808). For instance, various subsets of the plurality of messages may be communicated to the user at different times in order to collectively communicate the plurality of messages.

Responsive to selection of a first message in the first plurality of messages by a user at a user device 102, a subset of messages in the first plurality of messages that are similar to the first message are selected based upon respective comparisons between (i) a continuous vector representation of a first set of words in the first message and (ii) a continuous vector representation of a corresponding set of words in each respective message in the subset of messages (810). That is, those respective messages that are deemed to be most similar in the plurality of messages to the first message, based upon comparisons of the continuous vector representation of such messages to a continuous vector representation of the first message, are selected as the subset of messages. In some embodiments, the words in the first set of words are in a subject header of the first message, and the words in the corresponding set of words in the respective message in the subset of messages are in the subject header of the respective message (812).

In some embodiments the selecting, for the first set of words, comprises selecting a subset of words or phrases in a message body of the first message, the selecting including, for at least one respective word or phrase in the message body, replacing the respective word or phrase with a synonym for the respective word or phrase obtained from a knowledge graph, thereby including the synonym for the respective word or phrase in the first set of words in place of the respective word or phrase (814).

In some embodiments, the selecting is further based on a comparison of meta-information extracted from the first message and meta information extracted from each respective message in the first plurality of messages (816). Examples of meta information include, but are not limited to message sender identity, message recipient identity, message category, message date, and message sender domain (818).

In some embodiments, the selecting comprises parsing a message body of the first message into sentences, extracting one or more verb-object or verb-subject word pairs from sentences in the message body of the first message for inclusion in the first set of words, parsing a respective message body of each message in the subset of messages into sentences, and extracting one or more verb-object or verb-subject word pairs from sentences in a message body of each respective message in the subset of messages for inclusion in the corresponding set of words for the respective message in the subset of messages (820).

An identification of each message in the subset of messages is displayed (822). An example of such an identification is the identification of messages 608 and 610 in FIG. 6C and the identification of the messages in panel 708 of FIG. 7. In typical embodiments, an identification of each message in the subset of messages is displayed. In some embodiments, the identification is a synopsis of each message (e.g., the message header or a selection of key informative words in the message). In some embodiments, the identification of a respective message is the full message. In some embodiments, the identification of a respective message is a portion of the respective message, such as the first N words of the message, where N is a positive integer. In some embodiments, the representation of a respective message includes a representative graphic element from the respective message. In some embodiments, the identification of a respective message in the subset of messages includes metadata associated with the respective message, such as the sender of the message, a label associated with the message, the data or time the message was sent, an indication as to whether the user has already read the message, a size of the message, or other metadata.

In embodiments, where the user selection of the first message was part of a user initiated message correction event, the user is prompted as to whether to apply the message category correction event to any one of the messages in the selected subset of messages (824). Upon receipt of an affirmative response, the message category correction event is applied to messages in the subset of messages selected by the user (826).

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first object could be termed a second object, and, similarly, a second object could be termed a first object, without changing the meaning of the description, so long as all occurrences of the "first object" are renamed consistently and all occurrences of the "second object" are renamed consistently. The first object and the second object are both objects, but they are not the same object.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method of organizing messages, the method comprising:
   at a computer system having one or more processors, and memory storing one or more programs for execution by the one or more processors:
   communicating a first plurality of messages to a user with a designation of the message category of each respective message in the first plurality of messages, the first plurality of messages including, for each respective message category in a plurality of message categories, at least one message in the respective message category;

for each message in the first plurality of messages, computing a respective continuous vector representation of a set of words in the respective message according to a predetermined vector space model with more than 50 dimensions, wherein each vector component of the respective vector representation is a decimal number in a predetermined continuous range;

responsive to selection of a first message in the first plurality of messages by the user:
  selecting a subset of messages in the first plurality of messages that are similar to the first message based upon respective comparisons between (i) the continuous vector representation of the first message and (ii) the continuous vector representation of each respective message in the first plurality of messages, wherein each respective comparison comprises:
    computing a respective cosine distance between the continuous vector representation of the first message and the continuous vector representation of the respective message; and
    comparing the respective cosine distance to a predetermined threshold value; and
  displaying an identification of each respective message in the subset of messages.

2. The method of claim 1, wherein the user selection of the first message is part of a message category correction event for the first message initiated by the user.

3. The method of claim 2, the method further comprising prompting the user as to whether to apply the message category correction event to any one of the messages in the subset of messages, wherein
  upon receipt of an affirmative response, the message category correction event is applied to messages in the subset of messages selected by the user.

4. The method of claim 2, wherein, prior to the message category correction event, a message in the subset of messages is in a different category in the plurality of message categories than the first message.

5. The method of claim 4, the method further comprising: designating the subset of messages as a new category; and adding the new category to the plurality of message categories.

6. The method of claim 4, the method further comprising: providing a navigation panel for navigating the subset of messages wherein the identification of each respective message in the subset of messages that is displayed is included in the navigation panel.

7. The method of claim 1, the method further comprising: classifying, prior to the communicating, each message in the plurality of messages using a classifier, thereby independently identifying a message category in the plurality of message categories for each respective message in the first plurality of messages.

8. The method of claim 7, the method further comprising: designating the subset of messages as a new category; adding the new category to the plurality of message categories; and updating the classifier to include an ability to classify messages into the new category.

9. The method of clam 1, wherein the communicating comprises delivering messages in the first plurality of messages to a user device associated with the user at a plurality of discrete instances over a period of time, thereby collectively communicating the first plurality of messages during the period of time.

10. The method of claim 1, the method further comprising:
  identifying a second message, in a second plurality of messages, that is deemed to be similar to the first message based upon a comparison of (i) continuous vector representations of the first set of words in the first message and (ii) continuous vector representations of a corresponding set of words in the second message;
  categorizing the second message into the same category as the first message; and
  communicating the second message to the user with a designation of the message category of the second message.

11. The method of claim 1, wherein
  each word in the first set of words is from a subject header of the first message, and
  each word in each respective corresponding set of words is from a subject header of the corresponding message in the subset of messages.

12. The method of claim 1, the method further comprising selecting, for the first set of words, a subset of words or phrases in a message body of the first message, wherein the selecting includes, for at least one respective word or phrase in the message body, replacing the respective word or phrase with a synonym for the respective word or phrase obtained from a knowledge graph, thereby including the synonym for the respective word or phrase in the first set of words in place of the respective word or phrase.

13. The method of claim 1, wherein the selecting is further based on a comparison of meta-information extracted from the first message and meta-information extracted from each respective message in the first plurality of messages.

14. The method of claim 13, wherein the meta-information includes a plurality of: message sender identity, message recipient identity, message category, message date, and message sender domain.

15. The method of claim 13, wherein:
  the meta-information extracted from the first message and extracted from each message in the first plurality of messages is represented as a respective meta-vector with a plurality of feature components, and each feature component is encoded using a Boolean value that specifies whether the respective message has the respective feature;
  the comparison between the meta-information extracted from the first message and meta-information extracted from a respective message in the first plurality of messages comprises determining a respective dot product between (a) the meta-vector for the first message and (b) the meta-vector for the respective message; and
  the respective dot product and the respective continuous vector representation comparison of the respective message are both used to determine whether to include the respective message in the subset of messages.

16. The method of claim 1, wherein the selecting further comprises:
  parsing a message body of the first message into sentences;
  extracting one or more verb-object or verb-subject word pairs from sentences in the message body of the first message for inclusion in the first set of words;
  parsing a respective message body of each message in the subset of messages into sentences; and extracting one or more verb-object or verb-subject word pairs from sentences in a message body of each respective message in the subset of messages for inclusion in the corresponding set of words for the respective message in the subset of messages.

17. The method of claim 1, wherein a comparison between a continuous vector representation of the first set of words in the first message and the continuous vector representation of the corresponding set of words in a specified message in the subset of messages comprises determining the cosine angle between (a) the continuous vector representation of the first set of words and (b) the continuous vector representation of the corresponding set of words for the specified message.

18. A computing system, comprising:
one or more processors;
a display; and
memory storing one or more programs to be executed by the one or more processors;
the one or more programs comprising instructions for:
communicating a first plurality of messages to a user with a designation of the message category of each respective message in the first plurality of messages, the first plurality of messages including, for each respective message category in a plurality of message categories, at least one message in the respective message category;
for each message in the first plurality of messages, computing a respective continuous vector representation of a set of words in the respective message according to a predetermined vector space model with more than 50 dimensions, wherein each vector component of the respective vector representation is a decimal number in a predetermined continuous range;
responsive to selection of a first message in the first plurality of messages by the user:
selecting a subset of messages in the first plurality of messages that are similar to the first message based upon respective comparisons between (i) the continuous vector representation of the first message and (ii) the continuous vector representation of each respective message in the first plurality of messages, wherein each respective comparison comprises:
computing a respective cosine distance between the continuous vector representation of the first message and the continuous vector representation of the respective message; and
comparing the respective cosine distance to a predetermined threshold value; and
displaying an identification of each respective message in the subset of messages.

19. The computing system of claim 18, wherein
each word in the first set of words is from a subject header of the first message, and
each word in each respective corresponding set of words is from a subject header of the corresponding message in the subset of messages.

20. The computing system of claim 18, the one or more programs further comprising instructions for:
selecting, for the first set of words, a subset of words or phrases in a message body of the first message, wherein the selecting includes, for at least one respective word or phrase in the message body, replacing the respective word or phrase with a synonym for the respective word or phrase obtained from a knowledge graph, thereby including the synonym for the respective word or phrase in the first set of words in place of the respective word or phrase.

21. The computing system of claim 18, wherein the selecting further comprises:
parsing a message body of the first message into sentences;
extracting one or more verb-object or verb-subject word pairs from sentences in the message body of the first message for inclusion in the first set of words;
parsing a respective message body of each message in the subset of messages into sentences; and
extracting one or more verb-object or verb-subject word pairs from sentences in a message body of each respective message in the subset of messages for inclusion in the corresponding set of words for the respective message in the subset of messages.

22. A non-transitory computer readable storage medium storing one or more programs configured for execution by a computer, the one or more programs comprising instructions for:
communicating a first plurality of messages to a user with a designation of the message category of each respective message in the first plurality of messages, the first plurality of messages including, for each respective message category in a plurality of message categories, at least one message in the respective message category;
for each message in the first plurality of messages, computing a respective continuous vector representation of a set of words in the respective message according to a predetermined vector space model with more than 50 dimensions, wherein each vector component of the respective vector representation is a decimal number in a predetermined continuous range;
responsive to selection of a first message in the first plurality of messages by the user:
selecting a subset of messages in the first plurality of messages that are similar to the first message based upon respective comparisons between (i) the continuous vector representation of the first message and (ii) the continuous vector representation of each respective message in the first plurality of messages, wherein each respective comparison comprises:
computing a respective cosine distance between the continuous vector representation of the first message and the continuous vector representation of the respective message; and
comparing the respective cosine distance to a predetermined threshold value; and
displaying an identification of each respective message in the subset of messages.

23. The non-transitory computer readable storage medium of claim 22, wherein
each word in the first set of words is from a subject header of the first message, and
each word in each respective corresponding set of words is from a subject header of the corresponding message in the subset of messages.

24. The non-transitory computer readable storage medium of claim 22, wherein the one or more programs further comprise instructions for:
selecting, for the first set of words, a subset of words or phrases in a message body of the first message, wherein the selecting includes, for at least one respective word or phrase in the message body, replacing the respective word or phrase with a synonym for the respective word or phrase obtained from a knowledge graph, thereby including the synonym for the respective word or phrase in the first set of words in place of the respective word or phrase.

25. The non-transitory computer readable storage medium of claim 22, wherein the selecting is further based on a comparison of meta-information extracted from the first message and meta-information extracted from each respective message in the first plurality of messages.

* * * * *